United States Patent [19]

Haugh

[11] Patent Number: 5,765,502
[45] Date of Patent: Jun. 16, 1998

[54] PET BED WITH REMOVABLE BOLSTER

[75] Inventor: Scott Haugh, Lockport, Ill.

[73] Assignee: Flexi-Mat Corporation, Chicago, Ill.

[21] Appl. No.: 634,374

[22] Filed: Apr. 18, 1996

[51] Int. Cl.⁶ .................................................. A01K 1/035
[52] U.S. Cl. ........................................ 119/28.5; 5/722
[58] Field of Search ........................... 119/28.5, 526; 5/402, 691, 694, 722, 723, 737, 738, 740

[56] References Cited

U.S. PATENT DOCUMENTS

| 984,324 | 2/1911 | Von Below | 5/722 |
|---|---|---|---|
| 1,469,523 | 10/1923 | McGarvey | 5/402 X |
| 1,569,710 | 1/1926 | Burt | 119/28.5 |
| 3,890,658 | 6/1975 | Petersilie | 5/722 X |
| 3,989,008 | 11/1976 | Neumann | 119/28.5 |
| 4,860,689 | 8/1989 | Stewart | 119/28.5 |
| 5,010,843 | 4/1991 | Henry | 119/28.5 |
| 5,109,559 | 5/1992 | West | 5/691 X |
| 5,197,411 | 3/1993 | Scharzenbart | 119/28.5 |

OTHER PUBLICATIONS

'Braided "Jacobean" Bed' from p. 14 of Spring 1996 catalog entitled *In The Company Of Dogs*.
'Pucker Bed' from back page of Spring 1996 catalog entitled *In The Company Of Dogs*.
'Cuddler' Bed from 1994 Brochure of Flexi-Mat Corporation entitled *Flexi-Mat's Country Quilt Collection*.
'Flip Chair', 'Wing Chair', and 'Flip Couch' from 1995 Brochure Of Flexi-Mat Corporation entitled *Flexi-Mat's Cuddle-Up* 'Cuddler' from 1996 Brochure of Flexi-Mat Corporation entitled *Flexi-Mat's Poly/Cedar Cuddler*.
'Rainbow Cuddler' from 1991 Brochure of Flexi-Mat Corporation entitled *There's Gold At The End Of Our Rainbow*.
'Kozy Kup' from 1996 Brochure of Flexi-Mat Corporation entitled *Flexi-Mat's Kozy Kup*.
'Kitty Kup' from 1996 Brochure of Flexi-Mat Corporation entitled *Flexi-Mat's Kitty Kup*.

*Primary Examiner*—Robert P. Swiatek
*Assistant Examiner*—Elizabeth Shaw
*Attorney, Agent, or Firm*—Laff, Whitesel, Conte & Saret, Ltd.

[57] ABSTRACT

A pet bed comprising an outer covering, a removable cushion disposed within the outer covering to form a cushioned bottom portion, and a bolster removably affixed to the interior of the outer covering and disposed about at least a portion of the perimeter of the bottom portion. The outer covering further includes a reclosable access opening permitting both the bottom cushion and bolster to be removed as needed.

11 Claims, 2 Drawing Sheets

PET BED WITH REMOVABLE BOLSTER

FIELD OF THE INVENTION

This invention relates generally to a pet bed and in particular to a pet bed having a removable bolster.

BACKGROUND OF THE INVENTION

Pet beds were originally devised both for the comfort of animal pets and to keep the animals from commandeering household furnishings. Although a simple cushion is often used as a pet bed, many animals would rather occupy a favorite couch or human bed than sleep on a mere cushion.

Much of the animal's reluctance to quit the family sofa is traceable to the animal's need to feel secure. Thus, pet beds having surrounding wall portions are more popular with pets. These wall portions extend upwardly from the periphery of the pet bed, leaving an opening through which the animal can enter and leave, and allowing the animal to see out even while in a supine position.

The wall portion can also be used as a headrest by animals who feel safer with a better view of their surroundings, but the wall does not provide support for the heavier breeds of animals. The wall tends to collapse under the weight of heavier animals unless it is made of material so rigid that it is uncomfortable for lighter animals.

In one popular method for pet bed fabrication, the base and wall portions are formed from two glued pieces of fairly firm material, such as foam. The pet bed is then provided with a single removable cover, which is generally a washable fabric. The foam material from which the pet bed is constructed is not easily washable, due to the bulk of the two glued foam pieces.

In another popular pet bed style, the wall portion is formed from a single piece of foam, often attached to a vinyl sheet bottom portion, and only the wall portion is then covered with fabric. The fabric is generally sewn around the wall and is therefore not removable for washing. In order to make this type of pet bed more comfortable, a separate bottom cushion with its own fabric cover is provided for insertion over the bottom portion. This requires two separate fabric covers, one for the wall and one for the bottom cushion, and this adds to the cost of manufacture. Pet beds are also known in which the bottom cushion is stuffed with replaceable foam pieces or other stuffing material, treated with an odor retarding agent, because odor and washability are of major concern to the pet's owner.

Yet another pet bed has a bottom cushion encased in fabric with an upstanding wall extending partially around the periphery of the bottom cushion. The wall is formed from multiple pockets sewn in the encasing fabric, and each pocket is stuffed with polyester fill. Because the pockets are permanently sewn into the encasing fabric, the fill is not accessible and cannot be replaced without replacing the entire fabric. This creates a major odor problem when, for example, the pet urinates on the wall.

Accordingly, a need arises for a structurally sound pet bed that is designed for the pet's comfort, regardless of whether the animal is light or heavy. The pet bed should be relatively inexpensive to manufacture, and should be equipped with a one-piece cover and separately removable bolster and bottom cushion for ease of cleaning.

SUMMARY OF THE INVENTION

These needs and others are satisfied by the present invention, comprising a pet bed having an outer covering, a removable cushion disposed within the outer covering to form a cushioned bottom portion, and a bolster removably affixed to the interior of the outer covering and disposed about at least a portion of the perimeter of the bottom portion. The outer covering includes a reclosable access opening that may be opened and closed with a zipper.

In one form of the invention, the bolster may be removably affixed to the interior of the outer covering by a plurality of hook-and-loop fastener straps. The outer covering may include a bolster pocket sized to accommodate the bolster, where the plurality of straps removably affixes the bolster within the bolster pocket. The bottom cushion rests within a bottom pocket which communicates with the bolster pocket. The removable cushion and the bolster are separately removable from the outer covering through the reclosable access opening.

Further objects, features, and advantages of the present invention will become apparent from the following description and drawings.

DETAILED DESCRIPTION OF THE INVENTION

Figure 1:
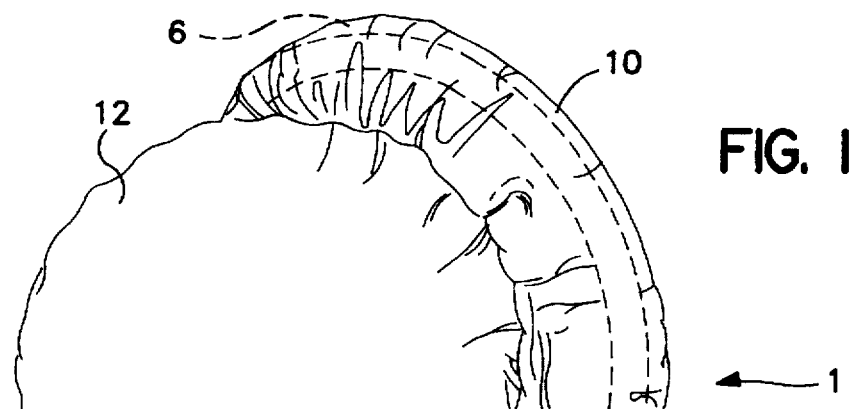
FIG. 1 is a top plan view of a pet bed in accordance with the present invention.
Figure 2:
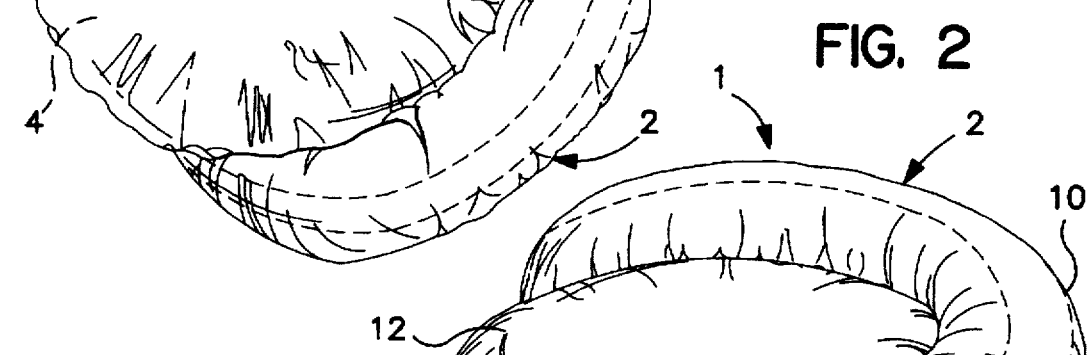
FIG. 2 is a perspective view of the pet bed of FIG. 1.
Figure 3:
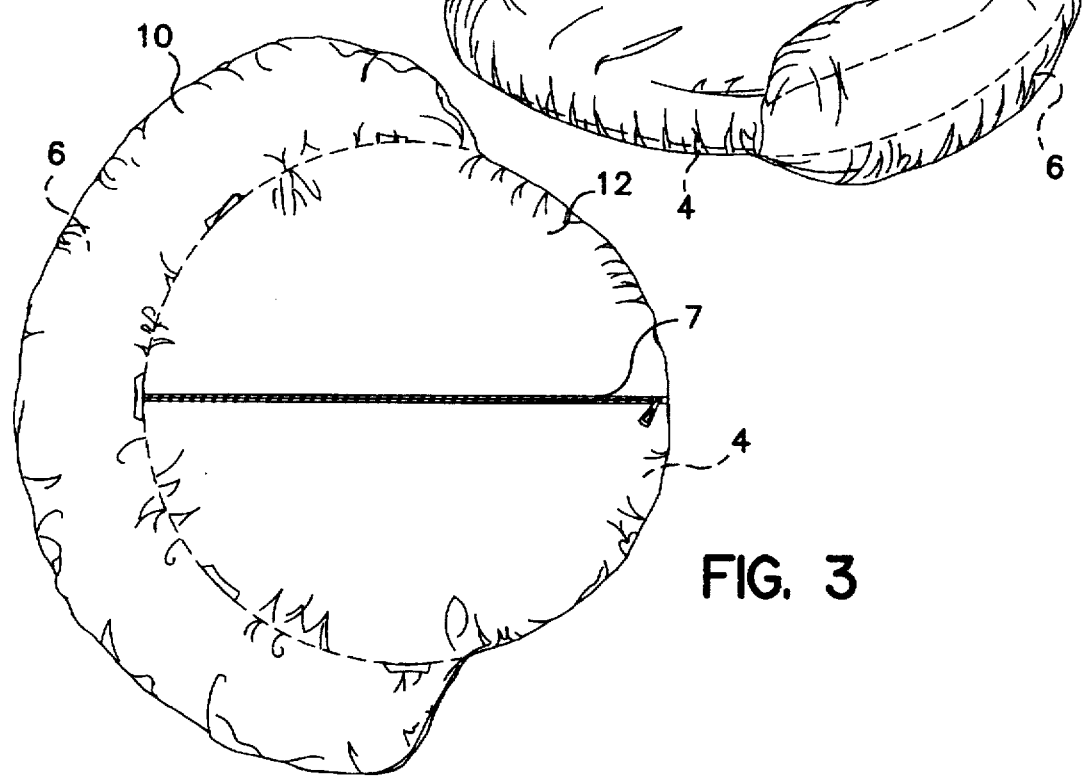
FIG. 3 is a bottom plan view of the pet bed of FIG. 1.
Figure 4:
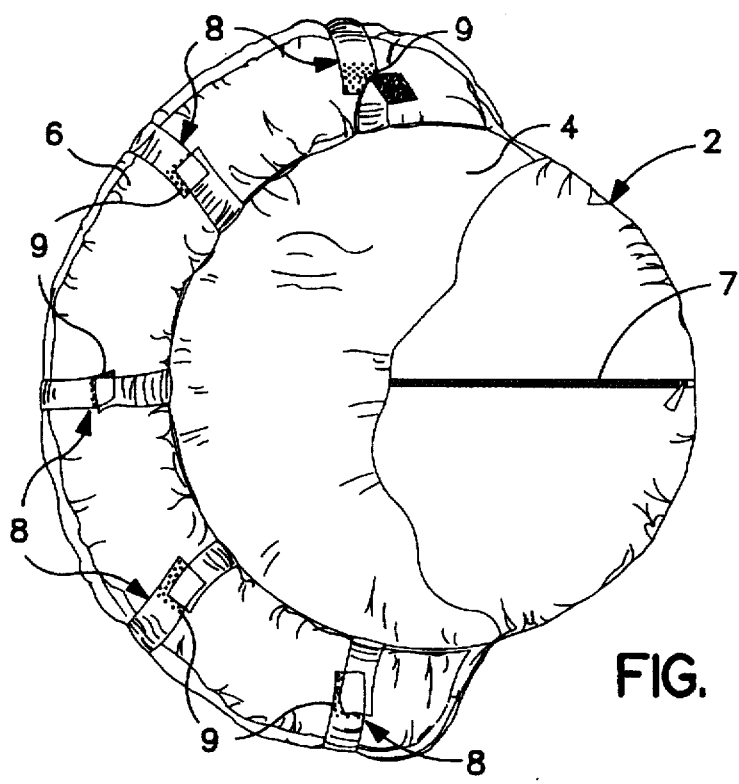
FIG. 4 is a bottom view of the pet bed of FIG. 1, with a portion of the outer covering cut away to illustrate the bolster removably affixed within the bolster pocket.
Figure 5:
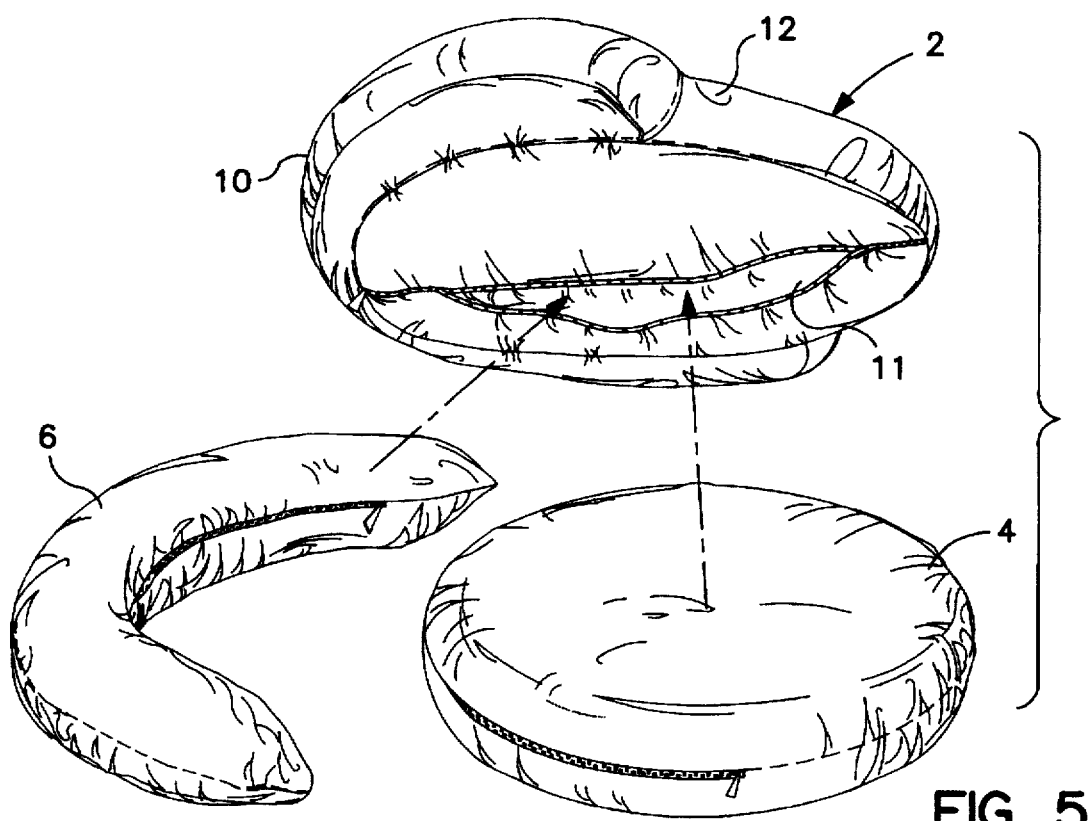
FIG. 5 is an exploded view of the pet bed of FIG. 1.

In accordance with the present invention, a pet bed is described that provides distinct advantages when compared to those of the prior art. The invention can best be understood with reference to accompanying drawing FIGS. I through 5.

The pet bed 1 of the present invention includes an outer covering 2, preferably fabricated from a durable material, such as a fabric that is easily cleaned. The cover material can be furnished with colors and/or designs to suit the needs of the pet owner.

The pet bed 1 includes a removable cushion 4 disposed within a bottom pocket 12 formed in the outer covering 2 to form a cushioned bottom portion of the pet bed 1. The cushion may be fabricated from any soft, durable material, but is preferably designed to be replaced at intervals by the user as it becomes soiled or worn.

Within a bolster pocket 10 provided in the outer covering 2, a bolster 6 is removably affixed. The bolster is disposed about at least a portion of the perimeter of the cushioned bottom portion of the pet bed 1. The bolster 6 is also formed from a soft, durable material, and is designed to be replaced as needed. Since the bolster 6 is more cylindrical or banana-shaped than flat, and more like a pillow than a wall, the bolster 6 tends to retain its shape even when used as a pillow by the pet, and does not easily collapse from the weight of the pet as in some prior art products.

The bolster is held in place by a plurality of fasteners or straps 8. The straps 8 are preferably the well-known hook-and-loop fasteners, such as Velcro®, although other fasteners, such as ties or straps with snaps or buckles, would perform adequately in this application. The fasteners are sewn or otherwise secured to the interior of bolster pocket 10 in the outer covering 2.

Removably affixing the bolster 6 within the bolster pocket 10 of the outer covering 2 has the advantage of lending structural integrity to the pet bed 1. Since the bolster 6 is much like a long, slender pillow, holding the bolster 6 in the bolster pocket 10 keeps the bolster relatively fixed in position with respect to the perimeter of the bottom portion of the pet bed 1.

Access to the interior of the outer covering 2 is preferably provided by a zipper 7. Thus, the bolster 6 is easily removable by the simple expedient of unzipping the zipper 7 on the bottom of the pet bed 1, disengaging the straps 8, and withdrawing the bolster through the reclosable access opening 11 that is sealed by the zipper 7. The bottom cushion 4 can also be withdrawn in the same way. The outer covering 2 can then be cleaned, and the bolster 6 and cushion 4 can be washed and replaced within the outer covering 2. Of course, a new bolster 6 or a new cushion 4 could also be replaced by the user as part of this removal operation.

Instead of a zipper, access to the interior of the bed could be provided through a slit in the covering 2. The slit could be concealed by merely overlapping flaps of the fabric. The flaps could be manually parted when necessary to remove the cushion or bolster.

It is also possible to combine other features with those just described. For example, the cushion 4 and bolster 6 could be cushions filled with foam pieces, polyester, styrofoam beads, a mixture of polyester and cotton, and other suitable materials, and be treated with an odor retarding agent such as cedar.

There has been described herein a pet bed that avoids the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A pet bed comprising:

an outer covering;

a removable cushion disposed within the outer covering to form a cushioned bottom portion; and a bolster removably disposed within the interior of the outer covering and substantially all of said bolster disposed exteriorly about at least a portion of the perimeter of the bottom portion without being secured to the removable cushion.

2. The pet bed of claim 1, wherein the outer covering further includes a reclosable access opening.

3. The pet bed of claim 2, wherein the reclosable access opening further includes a zipper.

4. A pet bed comprising:

an outer covering;

a removable cushion disposed within the outer covering to form a cushioned bottom portion; and a bolster removably affixed within the interior of the outer covering and disposed about at least a portion of the perimeter of the bottom portion, wherein the bolster is removably affixed within the interior of the outer covering by a plurality of straps secured to the outer covering.

5. The pet bed of claim 4, wherein the straps are hook-and-loop fasteners.

6. The pet bed of claim 4, wherein the outer covering includes a bolster pocket sized to accommodate the bolster, and the plurality of straps removably affixes the bolster within the bolster pocket.

7. A pet bed comprising:

an outer covering including a reclosable access opening;

a removable cushion disposed within the outer covering to form a cushioned bottom portion;

a bolster removably secured to the interior of the outer covering and disposed about at least a portion of the perimeter of the bottom portion;

such that the removable cushion and bolster are separately removable from the outer covering interior through the reclosable access opening.

8. The pet bed of claim 7, and means for closing the reclosable access opening.

9. A pet bed comprising;

an outer covering including a bolster pocket and a reclosable access opening;

a removable cushion disposed within the outer covering to form a cushioned bottom portion;

a bolster removably affixed within the bolster pocket and disposed about at least a portion of the perimeter of the bottom portion;

such that the removably cushion and bolster are separately removably from the outer covering interior through the reclosable access opening;

wherein the bolster is removably affixed within the bolster pocket by a plurality of straps.

10. The pet bed of claim 9, wherein the straps are hook-and-loop fasteners.

11. A pet bed comprising:

an outer covering including a bolster pocket and a reclosable access opening through a bottom portion of the outer covering;

means for closing the reclosable access opening;

a removable cushion disposed within the outer covering to form a cushioned bottom portion;

a bolster removably affixed within the bolster pocket by a plurality of straps that are secured about the bolster, the bolster disposed about at least a portion of the perimeter of the bottom portion;

such that the removable cushion and the bolster are separately removable from the outer covering interior through the reclosable access opening.

* * * * *

EX PARTE REEXAMINATION CERTIFICATE (6070th)
United States Patent
Haugh

(10) Number: US 5,765,502 C1
(45) Certificate Issued: Jan. 1, 2008

(54) PET BED WITH REMOVABLE BOLSTER

(75) Inventor: Scott Haugh, Lockport, IL (US)

(73) Assignee: Flexi-Mat Corporation, Chicago, IL (US)

Reexamination Request:
No. 90/007,502, Apr. 8, 2005

Reexamination Certificate for:
Patent No.: 5,765,502
Issued: Jun. 16, 1998
Appl. No.: 08/634,374
Filed: Apr. 18, 1996

(51) Int. Cl.
*A01K 29/00* (2006.01)
*A47C 17/00* (2006.01)

(52) U.S. Cl. .......................... 119/28.5; 5/722
(58) Field of Classification Search .............. 5/636, 5/640, 655, 922
See application file for complete search history.

(56) References Cited

U.S. PATENT DOCUMENTS

| | | | |
|---|---|---|---|
| 655,087 A | | 7/1900 | Jones |
| 2,032,248 A | | 2/1936 | Bins |
| 2,408,382 A | | 10/1946 | Dubick |
| D159,483 S | * | 8/1950 | Glassman .............. D6/604 |
| 3,566,423 A | | 3/1971 | Reinfeldt |
| 3,902,456 A | * | 9/1975 | David ................... 119/28.5 |
| 4,754,513 A | | 7/1988 | Rinz |
| 4,872,228 A | | 10/1989 | Bishop |
| 4,873,734 A | | 10/1989 | Pollard |
| 5,010,843 A | | 4/1991 | Henry |
| 5,035,013 A | * | 7/1991 | Bloom ...................... 5/420 |
| 5,109,559 A | | 5/1992 | West |
| 5,136,981 A | | 8/1992 | Barreto, III |
| 5,310,245 A | * | 5/1994 | Lyszczasz .............. 297/219.12 |
| 5,421,044 A | | 6/1995 | Steensen |
| 5,455,973 A | | 10/1995 | Brumfield |
| 5,581,832 A | * | 12/1996 | Bridley ...................... 5/655 |
| 5,586,350 A | | 12/1996 | Thonnessen et al. |
| 5,588,393 A | | 12/1996 | Heilborn |
| 5,826,537 A | | 10/1998 | Heilborn |

FOREIGN PATENT DOCUMENTS

| | | |
|---|---|---|
| DE | 31 38 463 | 4/1983 |
| DE | 4024807 A1 * | 2/1992 |
| DE | G9309699.2 | 9/1993 |
| EP | 0 633 338 | 11/1995 |
| JP | 7-051154 | 2/1995 |

OTHER PUBLICATIONS

Murray, AB et al.; "Dust Free Bedrooms in the Treatment of Asthmatic Children with House Dust or House Dust Mite Allergy: A Controlled Trial" *Pediatrics* 71(3):418–22 (Mar. 1, 1983).

Rivo, ML et al.; "Outpatient Management of Asthma in Adults" *American Family Physician* 45(5):2105–13 (May 1992).

Walshaw, MJ et al.; "Allergen Avoidance in House Dust Mite Sensitive Adult Asthma" *Quarterly Journal of Medicine, New Series* 58(226):199–215 (Feb. 1986).

* cited by examiner

*Primary Examiner*—Aaron J. Lewis

(57) ABSTRACT

A pet bed comprising an outer covering, a removable cushion disposed within the outer covering to form a cushioned bottom portion, and a bolster removably affixed to the interior of the outer covering and disposed about at least a portion of the perimeter of the bottom portion. The outer covering further includes a reclosable access opening permitting both the bottom cushion and bolster to be removed as needed.

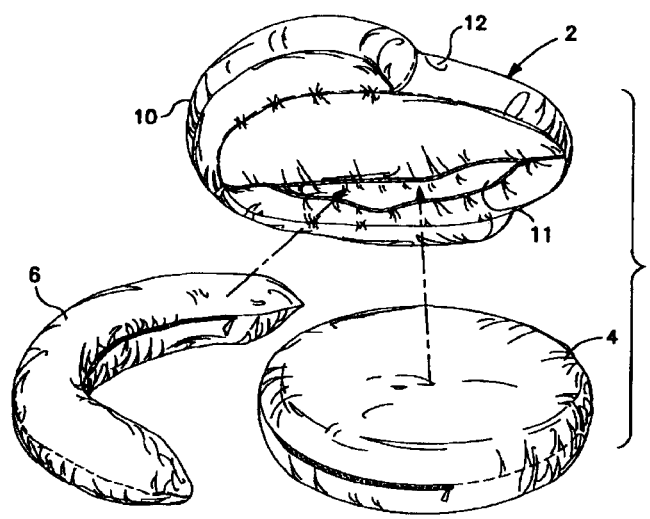

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 11 is confirmed.

Claims 1–10 are cancelled.

* * * * *